S. J. DIBBLE.
Thill-Couplings.
No. 134,981.
Patented Jan. 21, 1873.
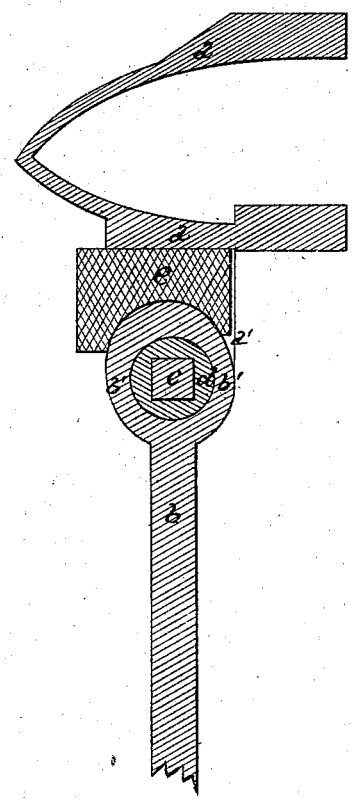
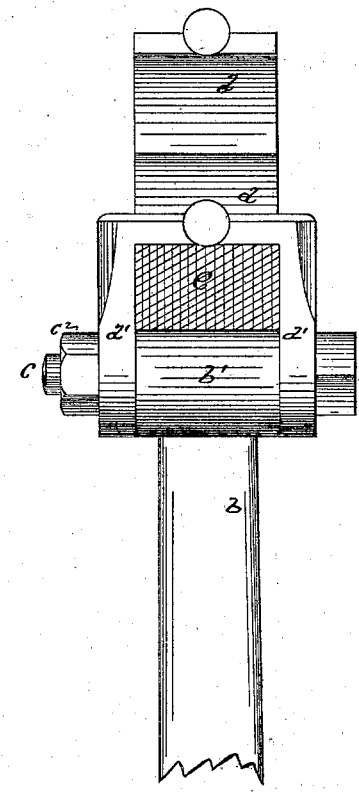
Witnesses.
L. Häfelin
Hanson B. Freeman
Inventor.
S. J. Dibble
by Wm. E. Simonds
Solicitor

UNITED STATES PATENT OFFICE.

SHRIGLEY J. DIBBLE, OF WETHERSFIELD, CONNECTICUT.

IMPROVEMENT IN THILL-COUPLINGS.

Specification forming part of Letters Patent No. 134,981, dated January 21, 1873.

*To all whom it may concern:*

Be it known that I, SHRIGLEY J. DIBBLE, of Wethersfield, in the county of Hartford and State of Connecticut, have invented certain new and useful Improvements in Clip-Shackles for Carriages, of which the following is a specification, reference being had to the accompanying drawing, in which—

Figure 1 is a view of the under side of the device, and Fig. 2 is a vertical sectional view through the dotted line $x\ x$.

The clip $a$, which embraces the forward axle of the carriage, is in all respects the same as a common clip, having the two ears $a'\ a'$, as is common. The letter $b$ indicates the metal part, which is commonly fastened to the shafts. The cylindrical enlargement $b'$ upon the end of the piece $b$ is commonly entirely cylindrical, except where it is attached to the part $b$, and has a small round hole drilled through it, fitting upon a round-bodied bolt running through round holes in the ears $a'\ a'$. Such an arrangement subjects the bolt to a great amount of wear, and not unfrequently this bolt becomes so worn as to suddenly snap in two while in use, thereby causing serious accidents. Such wear of the bolt $c$ is entirely prevented in my improved device by making the body of the bolt square, running it through square holes in the ears $a'\ a'$, and also through a square hole made through the metal cylinder $d$, which cylinder fits into a cylindrical hole in the enlargement $b'$, thereby allowing the enlargement and its connected strap $b$ to turn freely. This bolt is headed at $c^1$ and has a nut at $c^2$. The letter $e$ indicates a piece of rubber, such as is commonly inserted in this place to prevent the rattling of the parts. Commonly, this piece of rubber is apt to become set and lose its elasticity, and, consequently, its usefulness, as the common cylindrical form of the enlargement $b'$ presses steadily and constantly upon the rubber as well when the carriage is not in use as when it is. This difficulty I entirely obviate in this my improved device by making the enlargement $b'$ cam-shaped, as best seen in Fig. 2, wherein the parts are shown in the position which they occupy when the carriage is in use and the rubber is tightly pressed upon.

When the carriage is not in use the shafts are turned either up or down, thereby so turning the cam-shaped enlargement $b'$ that the rubber is released wholly or mostly from pressure, and is thereby allowed to again expand, thus causing the rubber to retain its elasticity indefinitely.

I claim as my invention—

The combination of the square bolt $c$, the cylinder $d$, the bearing on the end of the strap $b$, made cam-shaped, and the rubber $e$, arranged and operating substantially as described, for the purposes set forth.

S. J. DIBBLE.

Witnesses:
WM. E. SIMONDS,
FRANK G. FULLER.